United States Patent
Tsujii et al.

(10) Patent No.: US 6,641,670 B2
(45) Date of Patent: Nov. 4, 2003

(54) LEAF COATER FOR PRODUCING LEAF TYPE COATED SUBSTRATES

(75) Inventors: Masaya Tsujii, Shiga (JP); Shinji Tomimatsu, Shiga (JP); Hirofumi Kobayashi, Shiga (JP); Kazuyuki Hashimoto, Shiga (JP); Hiroshi Kawatake, Shiga (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/970,584

(22) Filed: Oct. 4, 2001

(65) Prior Publication Data

US 2002/0078890 A1 Jun. 27, 2002

(30) Foreign Application Priority Data

Oct. 12, 2000 (JP) ........................................ 2000-311888

(51) Int. Cl.[7] ................................................. B05C 5/02
(52) U.S. Cl. ........................ 118/610; 118/410; 118/429
(58) Field of Search ................................. 118/610, 410, 118/429; 425/197, 215; 427/356, 358

(56) References Cited

U.S. PATENT DOCUMENTS 4,831,961 A * 5/1989 Chino et al. ................ 118/410
5,505,995 A * 4/1996 Leonard ...................... 427/348
5,989,622 A * 11/1999 Iwashita et al. .............. 427/58

FOREIGN PATENT DOCUMENTS

| JP | 05-031434 | | 2/1993 |
| JP | 08-071480 | | 3/1996 |
| JP | 08-229497 | * | 9/1999 |
| JP | 11-319675 | * | 11/1999 |

* cited by examiner

Primary Examiner—Laura Edwards
(74) Attorney, Agent, or Firm—Piper Rudnick LLP

(57) ABSTRACT

A leaf coater, in which a constant quantity of a coating solution is supplied intermittently from a coating solution supply source through a predetermined coating solution quantity intermittent supply and a coating solution applier to a blank substrate, for coating blank substrates one by one with the coating solution, characterized in that a coating solution filtration is provided in the coating solution flow pipeline from the coating solution supply source to the coating solution applier, and the Young's modulus of the filter medium in the coating solution filtration is not less than 200 MPa, while the pore size of the filter medium is in the range of 0.05 μm to 100 μm; and a method for producing coated substrates using the leaf coater.

6 Claims, 6 Drawing Sheets

LEAF COATER FOR PRODUCING LEAF TYPE COATED SUBSTRATES

BACKGROUND OF THE INVENTION

1. Field of the Invention

The present invention relates to a leaf coater and a method for producing leaf type coated substrates. In more detail, it relates to a leaf coater and a method for producing leaf type coated substrates, which allow the production of coated substrates excellent in the uniformity of the film thickness of an applied coating material.

2. Description of Related Art

A leaf coating refers to a method for coating a blank substrate in such a process that the blank substrate having a limited length in the coating direction of a coating solution are supplied one by one to a coater; each supplied blank substrate is coated with the coating solution in a predetermined length; the coated substrate completely coated with the coating solution is taken out of the coater; and the next blank substrate is supplied to the coater and coated as before to produce a coated substrate.

Coating relatively small blank substrates having a length of less than 2 m in the coating direction with a desired coating material, i.e., a leaf coating is used to produce plastic substrates for optical filters, glass substrates for liquid crystal display devices and glass substrates for color filters. In some cases, it is highly demanded that the coated substrates produced by leaf coating are thin and uniform in the coating thickness of the coating solution applied to the substrates.

Known leaf coating methods include spin coating method, roll coating method, bar coating method, die coating method and combinations of these methods.

In the spin coating method, a coating solution is dropped onto the center of the surface of a rotating substrate, and the dropped coating solution is spread on the surface of the substrate using the rotation of the substrate, to form a coating film on the surface of the substrate. A device used for producing coated substrates by the spin coating method is generally called a spin coater.

Spin coaters are widely used for photo resist coating of semiconductor wafers. A case of using a spin coater for the production of color filters is disclosed in JP-63107769-A. The coating film obtained by a spin coater can be very accurately uniformed in the thickness over the entire range of the substrate, if the rheological property of the coating solution is made Newtonian, as disclosed in JP-06348023-A and JP-07261378-A. In the case where the coating solution is non-Newtonian or has a high viscosity, a thick film portion is formed in the central portion of rotation, to degrade the uniformity of the film thickness. Furthermore, a spin coater spends the coating solution in a very large amount for obtaining a predetermined coating film thickness, to raise the production cost disadvantageously.

In the roll coating method, a rotating application roll is interposed between a coating solution pan containing a coating solution and a blank substrate, and the coating solution deposited on the application roll is transferred onto the blank substrate. A device used for producing coated substrates by the roll coating method is generally called a roll coater.

Roll coaters are often used in the case where long blank substrates are coated or where a blank substrate wound as a roll is coated, and they are also used for a leaf coating. Since the coating solution is transferred from the coating solution pan to the application roll, and then to the blank substrate, the coating solution is exposed to air for a long period of time and is likely to absorb moisture and to be deteriorated, and furthermore, the ingress of objects is likely to occur during the period of time disadvantageously.

In the bar coating method, a bar comprising a rod having thin wire wound around thereon is used to coat the substrate with a paste. A device used for producing coated substrates by the bar coating method is generally called a bar coater.

A bar coater is disclosed in JP-02258081-A. In the case of a bar coater, since the wire wound around the rod is kept in direct contact with the blank substrate, the leveling is poor in the case where the coating solution is non-Newtonian or has a high viscosity, and the marks of wire remain on the coated substrates disadvantageously.

In the die coating method, the coating solution is extruded from a slit formed in a die onto the substrate in opposite to the slit with a clearance kept between them, and the slit and the substrate are moved relatively to each other, to form a coating film on the substrate. A device used for producing coated substrates by the die coating method is generally called a die coater. A method of using a spray instead of the slit of the die is known as the spray coating method, and a method of using a nozzle instead of the slit of the die is known as the nozzle coating method.

Die coaters are widely used for thick film coating and continuous coating of a coating material having a high viscosity. Cases of using a die coater for the production of color filters are disclosed in JP-05011105-A, JP-05142407-A, JP-06339656-A, JP-08229482-A and JP-08229497-A. In the case where a coating film is formed using a die coater, the coating solution can be supplied to the blank substrate by the curtain flow method, extrusion method or bead method, as described in U.S. Pat. Nos. 4,230,793, 4,696,885 and 2,761,791.

In the bead method, a coating material reservoir called a coating material bead is formed between the slit and the blank substrate, and the coating material is drawn from the slip with the movement of the blank substrate or the movement of the die, to form a coating film on the blank substrate. According to the bead method, since the coating material as much as the coating material spent for the formation of the coating film is supplied from the slit, the formed coating film is very good in the uniformity of the film thickness. The coating material is little wasted, and since the coating material feed passage till the coating material is discharged from the slit is closed, the deterioration of the coating material and contamination of objects can be prevented. So, the quality of the obtained coating film can be kept high.

However, as described in JP-08229482-A and JP-08229497-A, it is very difficult to form a further more uniform coating film using a die coater. To form a further more uniform coating film, the coater becomes complicated.

For forming a further more uniform coating film, JP-08332436-A proposes a leaf coating method, in which the coating method for applying a coating solution in a straight direction by the roll coating method, bar coating method or die coating method is combined with a method of applying a coating solution by the spin coating. However, also in this case, the complication of the coater cannot be avoided.

At present, a technique that allows a further more uniform coating film to be formed using a less complicated coater is being demanded for the production of color filters for color liquid crystal display devices. If a color filter for a color liquid crystal display has any abnormal projections on the surface of the coating film that must be flat, the color filter substrate contacts the opposite board, to cause conduction, and a phenomenon called common shorts occurs, to cause display failures such as luminescent points and lines or black points and lines.

To avoid such events, it is necessary to develop a leaf coater that can prevent the formation of projections to cause common shorts on the coated substrate.

A leaf coater intended to inhibit, as far as possible, the formation of projections on the surface of the coating film caused depending on the conditions of the coating solution in the coating film forming step is proposed in JP-08229497-A.

The leaf coater comprises a coating solution supply source, a predetermined coating solution quantity intermittent supply means, a coating solution applying means for applying a coating solution to each blank substrate, a first coating solution flow pipeline connecting said coating solution supply means with said predetermined coating solution quantity intermittent supply means, a second coating solution flow pipeline connecting said predetermined coating solution quantity intermittent supply means and said coating solution applying means, and a filter provided in said first coating solution flow pipeline. In this leaf coater, the filter removes the objects contained in the coating solution.

Typical objects existing in the coating solution include the objects straying into the coating solution in the coating solution production process, the objects consisting of a polymer gel and insoluble monomer residues in the case where the coating solution is a polymer solution or polymer precursor solution, or the objects consisting of cohering particles and a binder resin (polymer or polymer precursor, and a photosensitive binder precursor if a photosensitive binder is used) in the case where the coating solution is a slurry.

Conventional filters include non-woven fabric filters and membrane filters made of polypropylene, polyethylene or ethylene tetrafluoride resin, and any of the filters is formed into a disc, pleated or processed as a winding, and accommodated in a filtration device.

Especially a non-woven fabric filter or membrane filter made of a fluorine resin is suitably used since it is good in solvent resistance.

In the case where the coating solution is a polymer solution or polymer precursor solution not containing particles, a membrane filter having a pore size in the range of 0.05 to 3.0 µm is used. In the case where the coating solution contains particles, a non-woven fabric filter having a pore size corresponding to the size of the particles intended to be removed is used for the purpose of removing only the coarse particles destined to be coating defects.

In the case where a pigment-dispersed color paste slurry for color filter use designed to have a pigment particle size of 0.1 µm or less is applied to have a film thickness of 2.0 µm, it was thought that removing coarse particles of 2.0 µm or more was ideal and that the use of a non-woven fabric filter having a pore size of 2.0 µm could achieve the purpose of removing coarse particles.

However, it was found that even when a leaf coater with a filter having a pore size adapted as above was used for coating, if the filter used had a filter medium made of a resin, i.e., a soft material having a small Young's modulus, especially large coarse polymer gel particles and coarse cohering particles could not be perfectly removed and remained as objects in the coating solution applied to the blank substrates. This mechanism is estimated to be as described below.

A case of leaf coating using said pigment-dispersed color paste for color filter use is discussed below. Let's assume that a coating solution having pigment particles of 0.1 µm or less dispersed in a photosensitive polymer precursor solution or non-photosensitive polymer solution used as a binder is applied by means of a leaf coater using the spin coating method, roll coating method, bar coating method, die coating method or a method comprising these methods in combination.

In this leaf coater, a non-woven fabric filter made of a resin designed to catch coarse particles of 2.0 µm or more is used in the coating solution flow pipeline between the coating solution supply tank and the coating head (this is called differently depending on the coater used; for example, it is called a discharge nozzle in the case of a spin coater or a die in the case of die coater), to filter the coating solution. Because of leaf coating, the coating solution is supplied intermittently to the filter, and the supplied coating solution is filtrated by the filter. The intermittent supply of the coating solution to the filter brings change of pressure acting on the filter receiving from the coating solution. It is estimated that the pressure variation acting on the filter makes the pore size of the soft non-woven fabric filter made of a resin larger than 2.0 µm, to bring about a phenomenon that the cohering pigment particles or solidified pigment-dispersed color paste particles or the coarse particles of polymer gel or insoluble photosensitive polymer precursor of more than 2.0 µm pass the filter, and that this phenomenon degrades the uniformity of the coating film formed on the surface of the blank substrate.

SUMMARY OF THE INVENTION

A leaf coating is characterized in that at every change from a coated substrate to the next new substrate on a coater, supplying of a coating solution from a coating solution supply source to a coating solution applying means is done intermittently, that is once suspended and re-started. So, it has peculiar problems.

As described above, one of the problems is that the coating solution filtration state in the coating solution filtration device provided in the coating solution flow pipeline between the supply of the coating solution and the application of the coating solution is affected by the intermittent flow of the coating solution.

The object of the present invention is to provide a leaf coater and a method for producing leaf type coated substrates, which solve the problem.

The invention provides coated substrates substantially free from the object defects caused by the coating solution. The coated substrates homogeneously coated with a coating solution provide color filters for display devices or color display devices having good performance.

A leaf coater of the invention comprises (a) a coating solution supply source, (b) a predetermined coating solution quantity intermittent supply means, (c) a coating solution applying means for applying a coating solution to each blank substrate, (d) a first coating solution flow pipeline connecting said coating solution supply source with said predetermined coating solution quantity intermittent supply means, (e) a second coating solution flow pipeline connecting said predetermined coating solution quantity intermittent supply means with said coating solution applying means, and (f) a coating solution filtration means provided in either said first or second coating solution flow pipeline, which comprises a housing having an inlet and an outlet of the coating solution and a coating solution filtration means composed of a filter medium provided in the passage of the coating solution in said housing, wherein (g) the Young's modulus of the filter medium in said coating solution filtration means is not less than 200 MPa and (h) the pore size of the filter medium is in the range of 0.05 μm to 100 μm.

In the leaf coater of the invention, it is preferable that said filter medium in said coating solution filtration means comprises a sintered metal.

In the leaf coater of the invention, it is preferable that said passage of the coating solution in said coating solution filtration means has a shape of smoothly expanding from said inlet toward said filter medium and/or smoothing reducing from said filter medium toward said outlet, and that the expanding and/or reducing rate conforms to the relation of the following formula (I) and/or (II):

$$0.025 \leq h_{IN}/(d_{FLT}-d_{IN}) \leq 1.0 \quad (I)$$

$$0.1 \leq h_{OUT}/(d_{FLT}-d_{OUT}) \leq 1.0 \quad (II)$$

where $d_{IN}$: Bore of the inlet [mm]

$d_{OUT}$: Bore of the outlet [mm]

$d_{FLT}$: Diameter actually used for filtration in the filter medium [mm]

$h_{IN}$: Distance from the inlet to the filter medium [mm]

$h_{OUT}$: Distance from the outlet to the filter medium [mm]

In the leaf coater of the invention, it is preferable that a screen is provided adjacently to said filter medium in said coating solution filtration means downstream of said filter medium, and that the rate of hole area of said screen is not less than 60%.

In the leaf coater of the invention, it is preferable that a screen is provided adjacently to said filter medium in said coating solution filtration means upstream of said filter medium, and that the rate of hole area of said screen is not less than 60%.

In the leaf coater of the invention, it is preferable that an annular seal is provided around the lateral circumferential face of said filter medium in said coating solution filtration means, to prevent the formation of any dead space.

A method for producing leaf type coated substrates of the invention, in which substrates are coated one by one with a coating solution by means of the leaf coater of the invention, to produce coated substrates, wherein the viscosity of the coating solution supplied from said coating solution supply source is not more than 100,000 mPa·s.

In the method for producing leaf type coated substrates of the invention, it is preferable that said coating solution is a slurry.

In the method for producing leaf type coated substrates of the invention, it is preferable that said slurry is a pigment dispersion.

In the method for producing leaf type coated substrates of the invention, it is preferable that the filtration rate of the coating solution through said filter medium in said coating solution filtration device is not less than 100 g/s·m².

In the method for producing leaf type coated substrates, it is preferable that a pressure gauge and a valve are provided in this order in the coating solution flow pipeline communicating with the coating solution outlet of said coating solution filtration device, that with the valve closed, the coating solution is supplied to the coating solution filtration device, to raise the internal pressure of said coating solution filtration device, and that when the pressure detected by the pressure gauge has reached a set value, the valve is suddenly opened to discharge the air remaining inside the coating solution filtration device.

DETAILED DESCRIPTION OF THE INVENTION

Embodiments for carrying out the invention are described below. Since the leaf coater and the method for producing leaf type coated substrates of the invention relate to a technique of coating blank substrates one by one as described above, the methods of coating the coating solution that can be used here include the spin coating method, roll coating method, bar coating method, die coating method, spray coating method and nozzle coating method.

The continuous coating and the leaf coating can be distinguished as described below. In the former coating, after cutting off the non-steadily coated region of the coating film upstream of the steadily coated region, the steadily coated region only is continuously used. In the latter coating, the entire region ranging from the beginning of coating to the end of coating is used as one member.

The invention relates to the latter leaf coater and method for producing leaf type coated substrates.

In the following, the invention is described in reference to a leaf coater using a die coater as the method of applying the coasting solution, but the leaf coater of the invention is not limited to a die coater.

Figure 1:
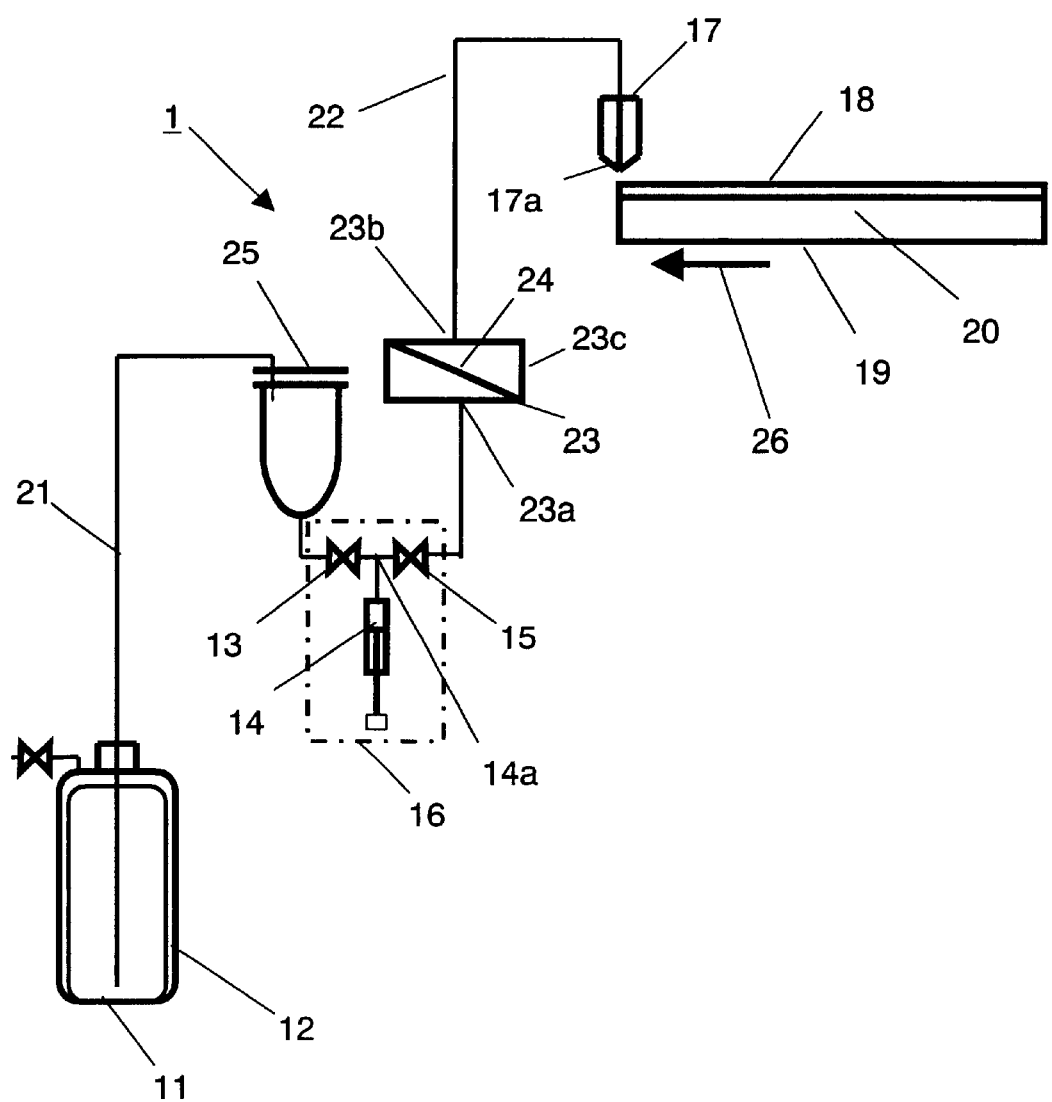
FIG. 1 is a flowchart of a coating solution in an example of the leaf coater of the invention using a die coater.

FIG. 1 is a flowchart of a coating solution in an example of the leaf coater of the invention. In FIG. 1, a leaf coater 1 has a coating solution supply source 12 comprising a coating solution tank 11, a predetermined coating solution quantity intermittent supply means 16 comprising a first changeover valve 13, a predetermined quantity supply pump 14 and a second changeover valve 15, a coating solution applying means 20 comprising a die 17 having a coating solution extruding slit 17a and a stage 19 mounted with a blank substrate 18, a first coating solution flow pipeline 21 connecting the coating solution tank 11 with the first changeover valve 13, and a second coating solution flow pipeline 22 connecting the second changeover valve 15 with the die 17.

The predetermined quantity supply pump 14 is a syringe pump, and the coating solution gateway 14a of the pump is connected with the first changeover valve 13 and the second changeover valve 15.

The second coating solution flow pipeline 22 is provided with a coating solution filtration means 23. The coating solution filtration means 23 comprising a housing 23c having the inlet 23a and outlet 23b of the coating solution and a filter medium (filter) 24 provided in the coating solution passage in the housing 23c.

In the leaf coater 1, the filter medium 24 in the coating solution filtration means 23 has a Young's modulus of 200 MPa or more and a pore size in the range of 0.05 μm to 100 μm.

In this example, the first coating solution flow pipeline 21 is provided with a buffer tank 25.

Figure 2:
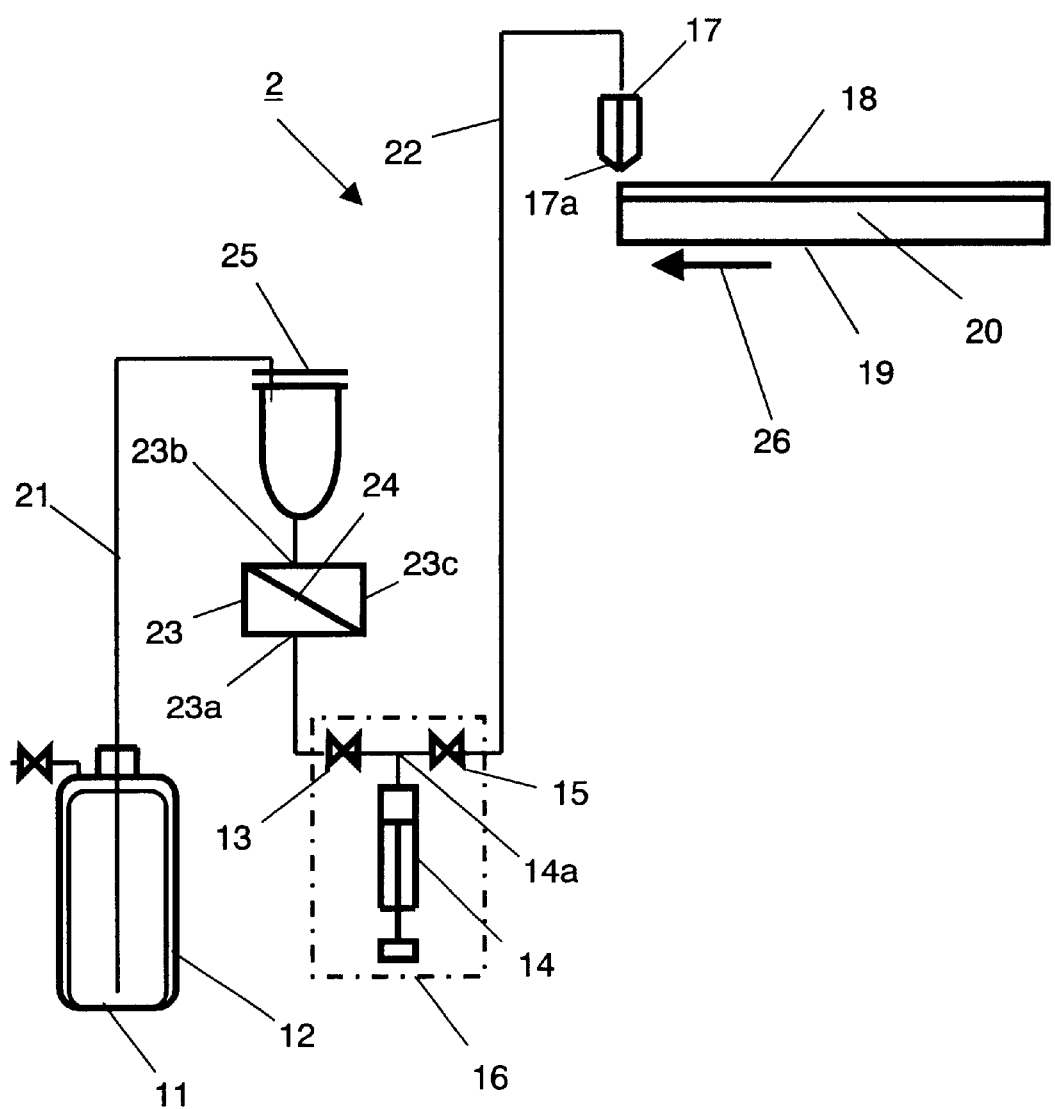
FIG. 2 is a flowchart of a coating solution in another example of the leaf coater of the invention using a die coater.

FIG. 2 is a flowchart of a coating solution in another example of the leaf coater of the invention using a die coater. The leaf coater 2 shown in FIG. 2 is different from the leaf coater 1 shown in FIG. 1, only in the constitution that the coating solution filtration means 23 in the leaf coater 1 shown in FIG. 1 is provided in the first coating solution flow pipeline 21 between the buffer tank 25 and the predetermined coating solution quantity intermittent supply means 16 in FIG. 2. Since the other components of the leaf coater 2 shown in FIG. 2 are the same as those of the leaf coater 1 shown in FIG. 1, the same components in the leaf coater 2 shown in FIG. 2 are given the same symbols as those used in the leaf coater 1 shown in FIG. 1.

Figure 3:
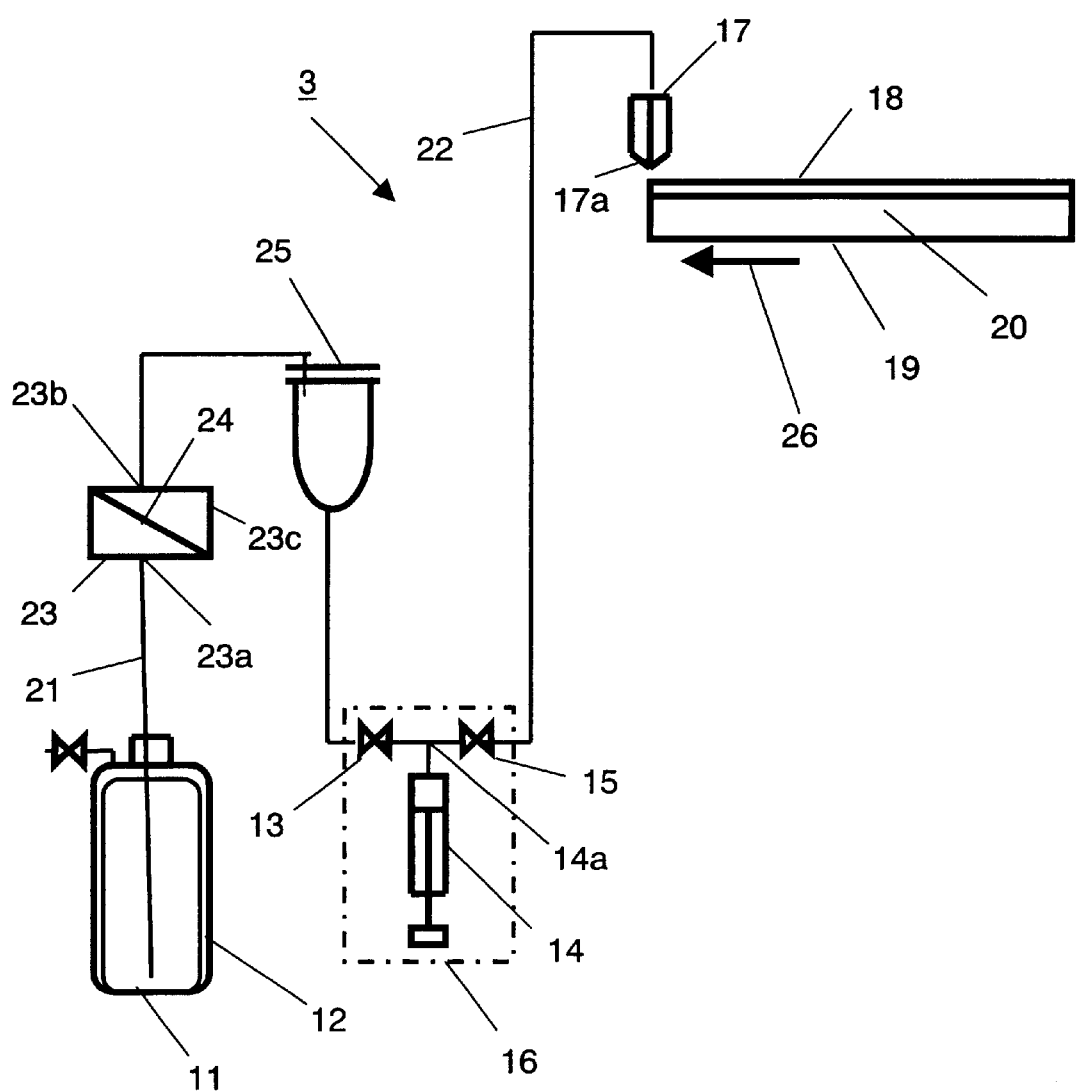
FIG. 3 is a flowchart of a coating solution in a further other example of the leaf coater of the invention using a die coater.

FIG. 3 is a flowchart of a coating solution in a further other example of the leaf coater of the invention using a die coater. The leaf coater 3 shown in FIG. 3 is different from the leaf coater 1 shown in FIG. 1, only in the constitution that the coating solution filtration means 23 in the leaf coater 1 shown in FIG. 1 is provided in the first coating solution flow pipeline 21 between the coating solution supply source 12 and the buffer tank 25 in FIG. 3. Since the other components of the leaf coater 3 shown in FIG. 3 are the same as those of the leaf coater 1 shown in FIG. 1, the same components of the leaf coater 3 shown in FIG. 3 are given the same symbols as those used in the leaf coater 1 shown in FIG. 1.

If the coating solution filtration means 23 is provided in the first coating solution flow pipeline 21 between the coating solution supply source 12 and the buffer tank 25, the frequency of intermittently filtering the coating solution can be decreased advantageously, but in view of the object removing effect of the coating solution reaching the die 17, it is preferable that the coating solution filtration means 23 is provided in the second coating solution flow pipeline 22 between the predetermined coating solution quantity intermittent supply means 16 and the die 17. While the coating solution stays in the buffer tank 25 and the predetermined coating solution quantity intermittent supply means 16, it can happen that objects unpreferable for coating film formation as described before are generated or that objects stray in from the external environment. These objects can be removed by the coating solution filtration means 23 immediately before the coating solution is discharged from the die, if the coating solution filtration means 23 is provided in the second coating solution flow pipeline 22.

The coating solution is supplied to the buffer tank 25 by pressure feed from the coating solution tank 11. When the predetermined quantity supply pump (syringe pump) 14 sucks the coating solution from the buffer tank 25, the first changeover valve 13 is opened and the second changeover valve 15 is closed.

The quantity Q (g) sucked by the predetermined quantity supply pump (syringe pump) 14 is decided in relation with the area S (m$^2$) and thickness t (μm) of the coating film formed on the blank substrate 18 and the solid content c (wt %) of the coating solution used for forming the coating film. If the specific gravity of the coating film is ρ (g/cm$^3$), the sucked quantity Q of the coating solution can be theoretically obtained from the following formula:

$$Q = S \cdot t \times 10^{-6} \cdot \rho \times 10^6 / (c \times 10^{-2})$$

After the coating solution is sucked by a predetermined amount, the first changeover valve 13 is closed and simultaneously the second changeover valve 15 is opened. The coating solution contained in the predetermined quantity supply pump (syringe pump) 14 is fed through the filter medium 24 of the coating solution filtration means 23 to the die 17 by the coating solution feed action of the predetermined quantity supply pump (syringe pump) 14.

The coating solution fed to the die 17 is discharged from the slit 17a and forms a liquid reservoir (bead) between the slit 17a and the blank substrate 18 on the stage 19. Subsequently the stage 19 starts moving in the direction of arrow 26, to form a film of the coating solution on the surface of the blank substrate 18. After a predetermined coating film has been formed, the stage 19 stops moving, and the second changeover valve 15 is closed.

Then, the coated substrate with the coating film completely formed is taken out of the stage 19, and the taken-out coated substrate is usually sent to a drying step.

Since the time T (s) during which the coating solution is discharged from the slit 17a to the blank substrate 18 is decided simply to meet the demand of tact time, the liquid feed rate v (g/s) of the predetermined quantity supply pump (syringe pump) 14 can be obtained from the following formula.

$$v = Q/T$$

If the filtration area of the filter 24 is $S_f$ (m$^2$), the filtration rate $v_f$ (g/s·m$^3$) can be obtained from the following formula.

$$v_f = v/S_f$$

The leaf coater 1 of the invention is characterized in that the filter (filter medium) 24 is installed upstream of the die 17, and that the Young's modulus of the filter medium 24 is 200 MPa or more.

If the filter medium 24 used has a Young's modulus of less than 200 MPa, the sudden change of filtration pressure caused when the coating solution is intermittently fed changes the pore size of the filter medium 24, and the desired filtration accuracy cannot be obtained. As a result, said various objects cannot be caught, and it becomes difficult to prevent the degradation in the uniformity of the coating film supposedly caused by them.

It is more preferable that the Young's modulus of the filter medium 24 is 500 MPa or more. More preferable is 1,000 MPa or more.

If the filter medium 24 used has a high Young's modulus, the pore size of the filter medium 24 is not changed even if the filtration pressure changes suddenly during intermittent liquid feed. So, the filter medium 24 can reliably catch/objects, and in addition, the action to disperse and crush a polymer gel, cohering pigment particles and their mixture described later can also be obtained. Thus, leaf type coated substrates having a high grade coating film free from the defects caused by objects can be produced.

On the other hand, if the coating solution is retained abnormally in the region where the coating solution is likely to be retained in the coating solution passage between the inlet 23a of the housing 23c of the coating solution filtration means 23 and the filter medium 24, it can happen that the cohering pigment particles and a polymer gel are generated. Also in this case, if the Young's modulus of the filter medium 24 is 200 MPa or more, the generated cohering pigment particles and gel can be reliably caught. It is preferable that the Young's modulus of the filter medium 24 is higher.

The Young's modulus of the filter medium 24 is measured according to the method described in JIS K 6911 if the filter medium 24 is made of a resin, or according to the method described in JIS R 1602 if it is ceramic, or using a tensile testing machine used for general material tests if it is made of a metal or any other material.

The materials having such a Young's modulus and capable of being used as the filter medium include glass fibers, porous ceramics and sintered metals, though not limited thereto. A sintered metal is preferable since it does not contain any alkali metal likely to be dissolved out. As the metal material, it is preferable to use stainless steel in view of rust prevention. A sintered metal filter can be obtained by sintering a fibrous metal or a powdery metal, and either of the materials can be used.

In the case where the coating solution contains charged particles like a pigment dispersion, the friction between the filter medium 24 and the charged particles caused in the layer of the filter medium 24 during liquid feed increases the electrification, and the particles cohere together. So, an electrically conductive metallic filter, especially sintered metal filter is preferable since it acts to discharge the electrification.

In the leaf coater of the invention, the pore size of the filter medium 24 is in the range of 0.05 μm to 100 μm.

If the filter medium 24 used has a pore size of less than 0.05 μm, the pressure loss due to the filter medium 24 becomes too high and liquid feed becomes difficult. If the filter medium 24 used has a pore size of more than 100 μm, the objects to be caught pass the filter.

In the case of a polymer solution or polymer precursor solution without particles contained in the coating solution, it is preferable that the pore size is smaller. A more preferable range is from 0.05 μm to 5 μm. In the case where the coating solution contains particles, it is preferable to select a filter medium 24 having a pore size suitable for optimizing the filtration accuracy depending on the target particle size to be achieved, for the purpose of removing only the coarse particles destined to be coating defects. For example, in the case of a pigment-dispersed color paste for color filter use, since the pigment has a particle size of 0.1 μm or less, a filter medium having a pore size in the range of 0.2 μm to 20 μm is preferable, and a filter medium having a pore size in the range of 0.5 μm to 10 μm is more preferable.

The pore size of the filter medium is obtained by the measurement method described in JIS K 3832 in reference to the bubble point.

The coating solution preferably used in the invention is a polymer solution or polymer precursor solution without containing the particles in the coating solution, or a slurry containing particles in the coating solution.

In the former case, the objects caused by a polymer gel and insoluble monomer residues can be removed as objects by means of filtration, and in the latter case, the objects caused by cohering particles and a binder resin (a polymer or polymer precursor, or a photosensitive binder precursor if a photosensitive binder is used) can be removed, to obtain a high grade coating film in either case.

It is preferable that the viscosity of the coating solution is 100,000 mPa·s or less. If the viscosity is more than 100,000 mPa·s, the pressure loss during filtration becomes large, and it becomes difficult to feed the solution through the filter medium 24. Furthermore, if the pressure loss becomes excessive, the desired pore size of the filter medium 24 changes unpreferably.

The viscosity is measured using E type viscometer (conical rotational viscometer) in a low viscosity range of less than 1,200 mPa·s, and a Brookfield type viscometer (cylinder rotational viscometer) in a high viscosity range of higher than it.

It is preferable that the filtration rate of the coating solution in the coating solution filtration device 23 is 100 g/s·m$^2$ or more. Though the detail is unknown, it was surprisingly confirmed that when a hard filter (filter medium) having an especially high Young's modulus was used, the action of dispersing and crushing a gel and cohering particles occurred. To exhibit this action more effectively, a filtration rate of 200 g/s·m$^2$ is preferable, and 300 g/s·m$^2$ or more is more preferable. The filtration rate can be obtained from the above-mentioned formula.

In the case where the filter medium 24 is disc-shaped and made of a resin, the filter medium 24 is low in pressure resistance because of the material and shape. In this case, it is desirable to install a pressure resistant plate (screen) having coating solution through holes adjacently to the back face of the filter medium 24.

Also in this case, if the filter medium has a Young's modulus of less than 200 MPa, the filter medium is compressed on the pressure resistant plate (screen), and the coating solution is abnormally retained inside the filter medium. As a result, the coating solution is likely to be solidified inside the filter medium. In the case where the coating solution is a polymer precursor solution, the objects caused by a polymer gel and insoluble monomer residues are likely to be generated. In the case where the coating solution is a slurry, the objects caused by cohering particles and a binder resin (a polymer or polymer precursor, or a photosensitive binder precursor if a photosensitive binder is used) are likely to be generated.

Therefore, even in the case where a pressure resistant plate (screen) is used together with a disc-shaped filter medium 24, the Young's modulus of the filter medium 24 must be 200 MPa or more. On the other hand, in the case where the Young's modulus of the filter medium 24 is 1,000 MPa or more, it is not necessary to install a pressure resistant plate (screen) on the back face of the filter medium 24 even if the filter medium 24 is shaped like a disc, and in this case, the problem that the coating solution is abnormally retained at the interface between the filter medium 24 and the pressure resistant plate (screen) can be avoided.

The coating solution filtration means 23 using a disc-shaped filter medium 24 is described below in more detail.

Figure 4:
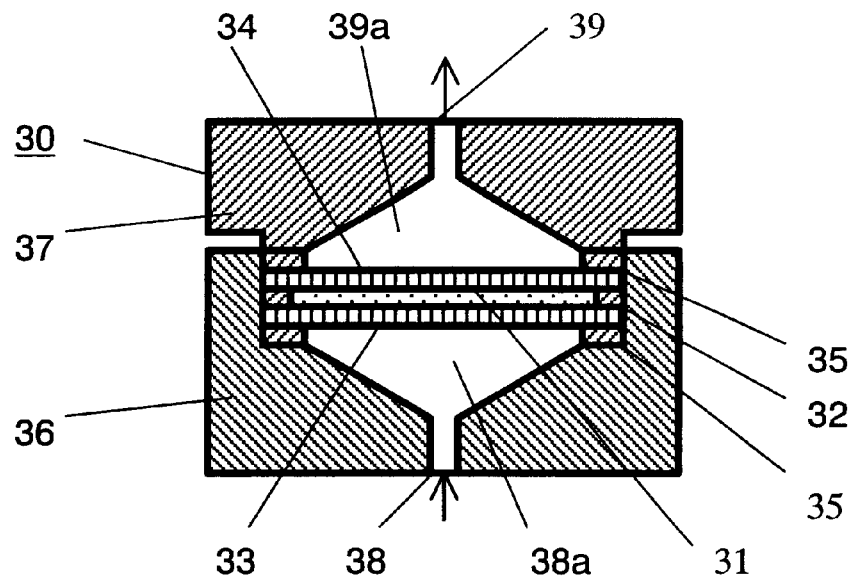
FIG. 4 is a vertical sectional view showing an example of the coating solution filtration device used in the leaf coater of the invention.
Figure 5:
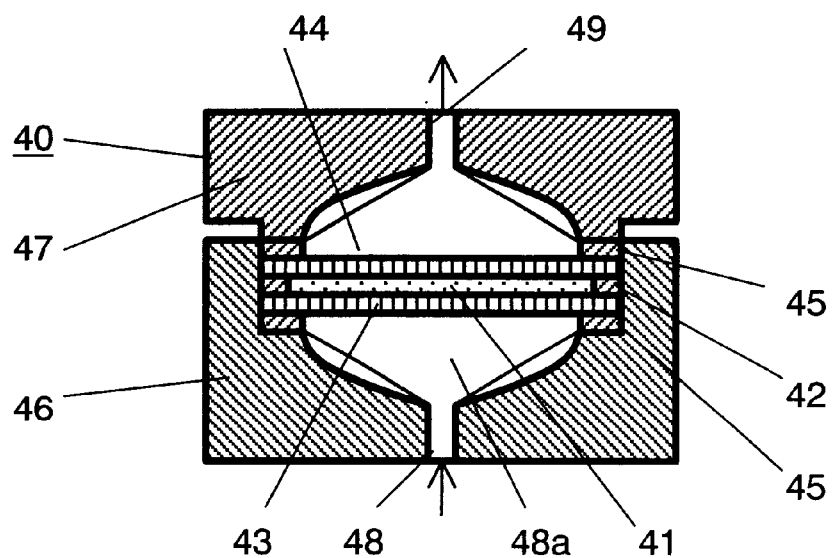
FIG. 5 is a vertical sectional view showing another example of the coating solution filtration device used in the leaf coater of the invention.

FIG. 4 is a vertical sectional view showing an example of the coating solution filtration means used in the leaf coater of the invention. In FIG. 4, the passage of the coating solution inside the coating solution filtration device 30 has a straight form. FIG. 5 is a vertical sectional view showing another example of the coating solution filtration means used in the leaf coater of the invention. In FIG. 5, the passage of the coating solution inside the coating solution filtration device 40 has a curved form.

The coating solution filtration device 30 of FIG. 4 or the coating solution filtration device 40 of FIG. 5 has an annular seal 32 or 42 around the lateral circumferential face of the disc-shaped filter medium 31 or 41 used for arresting the objects in the coating solution, to ensure that no substantial dead space is formed. The disc-shaped filter medium 31 or 41 is held between an upstream screen 33 or 43 and a downstream screen 34 or 44. The upstream screen 33 or 43 and the downstream screen 34 or 44 are installed in an upstream housing 36 or 46 and a downstream screen 37 or 47 through an annular packing 35 or 45 respectively. The upstream screen 33 or 43 and the downstream screen 34 or 44 function to support the filter medium 31 or 41.

Figure 8:
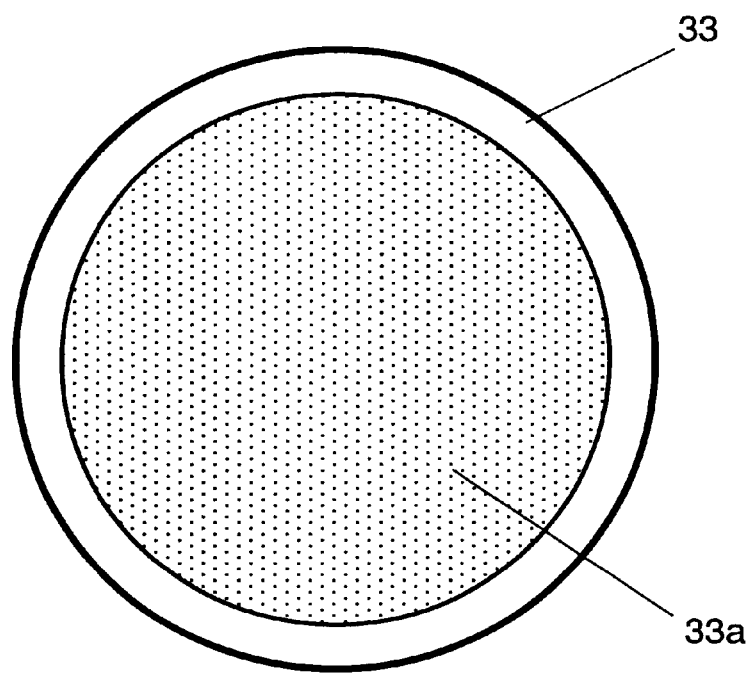
FIG. 8 is a plan view showing an example of the upstream screen used in the coating solution filtration device of the leaf coater of the invention.
Figure 9:
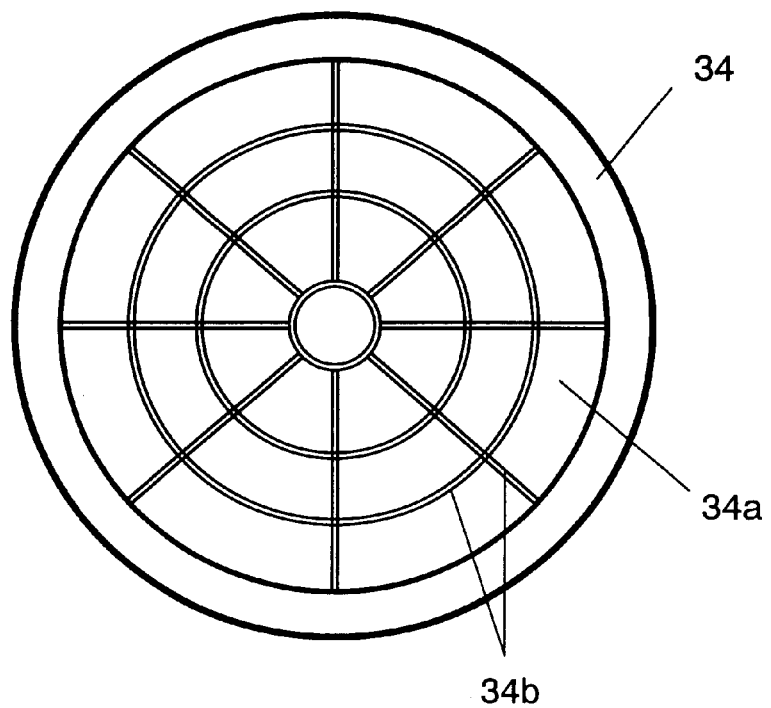
FIG. 9 is a plan view showing an example of the downstream screen used in the coating solution filtration device of the leaf coater of the invention.

FIG. 8 is a plan view showing an example of the upstream screen 33. The upstream screen 33 is a metallic disc having numerous holes 33a for allowing the coating solution to pass as freely as possible. FIG. 9 is a plan view showing an example of the downstream screen 34. The downstream screen 34 is a metallic disc having through portions 34a respectively with a large area for allowing the coating solution to pass as freely as possible. The upstream screen 33 shown in FIG. 8 can also be used as the downstream screen 34. On the contrary, the downstream screen 34 shown in FIG. 9 can also be used as the upstream screen 33.

In FIG. 4, the coating solution is supplied from the inlet 38 formed in the upstream housing 36 connected with the first coating solution flow pipeline 21 and passes through the passage 38a conically expanding toward the filter medium 31, being filtered by the filter medium 31. Then, it passes through a conically reducing passage 39a formed in the downstream housing 37 and flows through the outlet 39 into the second coating solution flow pipeline 22 connected with the outlet 39. The coating solution filtration device 30 is fixed by means of a bracket (not illustrated) installed on a machine frame (not illustrated) with the outlet 39 turned upward, to ensure that the coating solution flows upward when filtered.

Figure 6:
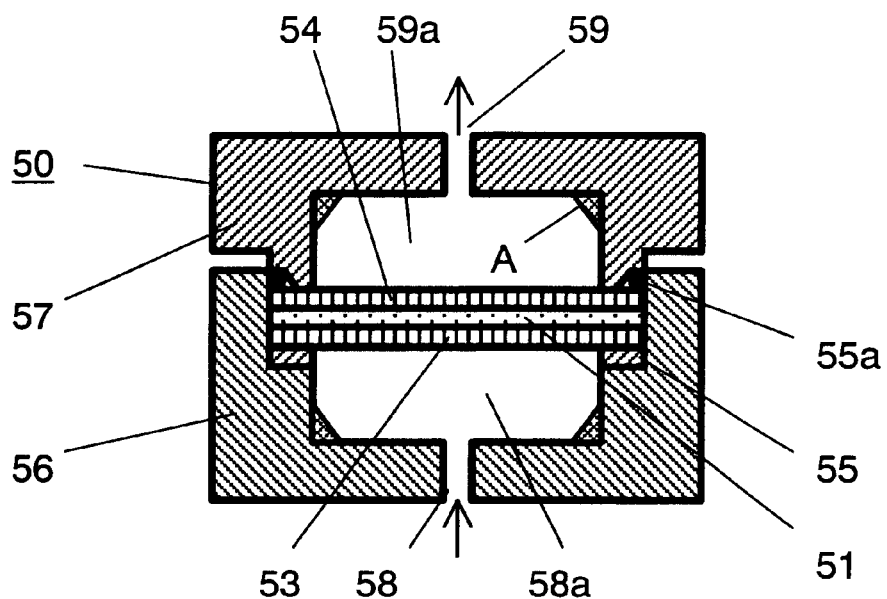
FIG. 6 is a vertical sectional view of a conventional coating solution filtration device.

FIG. 6 is a vertical sectional view of the coating solution filtration means used in a conventional leaf coater. The differences between the conventional coating solution filtration device 50 shown in FIG. 6 and the coating solution filtration device 30 or 40 preferably used in the invention are that the inside passages 58a and 59a of the upstream housing 56 and the downstream housing 57 of the conventional coating solution filtration device 50 have a cylindrical form without expanding or reducing, and that the conventional coating solution filtration device 50 does not have the annular seal for preventing the formation of dead space around the filter medium 51, while the sealing between the downstream screen 54 and the downstream housing 54 is achieved using an O ring 55a, instead of the annular packing. The other components of both the coating solution filtration devices are identical.

Figure 7:
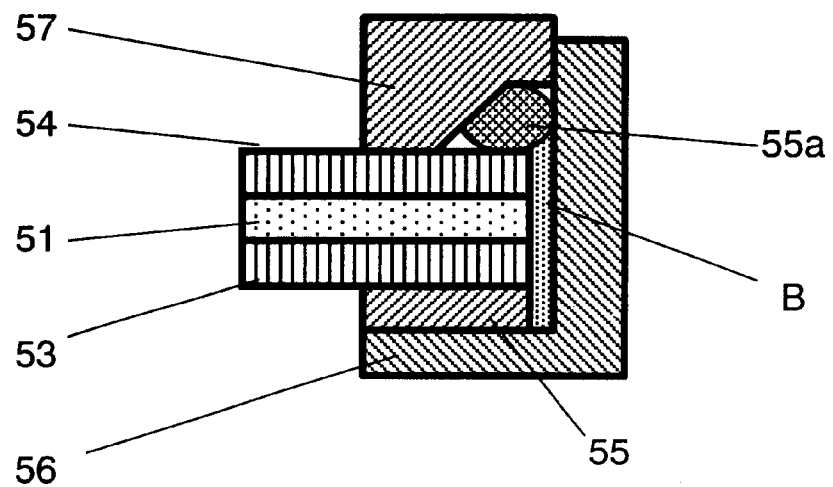
FIG. 7 is an expanded sectional view showing the sealing portion of the conventional coating solution filtration device of FIG. 6.

FIG. 7 shows the sealing state in the conventional coating solution filtration device 50 shown in FIG. 6, in which a laminate consisting of the upstream screen 53, the filter medium 51 and the downstream screen 54 are held between the O ring 55a and the annular packing 55. In the conventional coating solution filtration device 50, because of the constitution, a dead space B is formed around the filter medium 51, but in the coating solution filtration device 30 or 40 preferably used in the invention shown in FIGS. 4 or 5, the dead space B is not formed.

It is more preferable that the coating solution filtration device 30 or 40 used in the invention is constituted as described below for the purpose of decreasing the retention of the coating solution in the inside compared with that of the conventional coating solution filtration device 50.

The coating solution filtration device 30 shown in FIG. 4 is referred to in the following description. The passage 38a of the coating solution formed inside the upstream housing 36 of the coating solution filtration device 30 has a form of smoothly expanding from the inlet 38 toward the filter medium 31, and/or the passage 39a of the coating solution formed inside the downstream housing 37 has a form of smoothly reducing from the filter medium 31 toward the outlet 39.

It is preferable that the expanding and/or reducing rate conforms to the following formula (I) and/or (II).

$$0.025 \leq h_{IN}/(d_{FLT}-d_{IN}) \leq 1.0 \quad (I)$$

$$0.1 \leq h_{OUT}/(d_{FLT}-d_{OUT}) \leq 1.0 \quad (II)$$

where $d_{IN}$: Bore of the inlet 38 [mm]

$d_{OUT}$: Bore of the outlet 39 [mm]

$d_{FLT}$: Diameter actually used for filtration in the filter medium 31 [mm]

$h_{IN}$: Distance from the downstream portion of the inlet 38 (the border between the inlet 38 and the passage 38a) to the filter medium 31 [mm]

$h_{OUT}$: Distance from upstream portion of the outlet 39 (the border between the outlet 39 and the passage 39a) to the filter medium 31 [mm]

The passage in this case means a passage having an inlet and an outlet, in which the space between the inlet and the outlet is surrounded by an inner wall and is filled with the coating solution kept flowing.

The diameter actually used for filtration in the filter medium 31 corresponds to the diameter of the area effectively used for filtration in the filter medium 31. For example, even in the case where the diameter of the filter medium 31 per se is large, if the annular packing 35 and the annular seal 32 narrow the passage of the coating solution, the diameter actually used for filtration becomes smaller.

In FIGS. 4 or 5, the diameter of the portion not covered by the annular packing 35 or 45 of the filter medium 31 or 41 is the diameter actually used for filtration.

It is preferable that the perpendicular sectional form of the coating solution filtration device 30 or 40 (the sectional form obtained by cutting the filtration device along a plane perpendicular to the upstream-downstream direction) is almost circular, but as the case may be, ellipsoidal or like a closed curve. In this case, the diameter (the diameter of the inlet or outlet or the diameter actually used in the filter medium, etc.) is the diameter of the circle equivalent to the perpendicular sectional form in area.

If the position of the opening of the inlet in the inner wall face of the upstream housing is a, the position of the upstream face of the filter medium is b, the position of the downstream face of the filter medium is c and the position of the opening of the outlet in the inner wall face of the downstream housing is d, the distances of $h_{IN}$ and $h_{OUT}$ are the distance between positions a and b and the distance between positions c and d measured in the direction of fluid progression in the coating solution filtration device (the longitudinal direction of the coating solution filtration device and the thickness direction of the filter medium).

If the passages of the coating solution in the coating solution filtration device are formed like this, the retention in the coating solution filtration device 30 or 40 can be greatly decreased, since there are few portions where flow does not occur (retaining portions) like the retaining portions A at the edges of the upstream and downstream housings 56 and 57 of the conventional coating solution filtration device 50.

It is preferable that the passage expanding or reducing rate in the coating solution filtration device is 1.0 or less. More preferable is 0.3 or less. If the expanding or reducing ratio is more than 1.0, since the inside passage volume becomes large, the time necessary for perfectly replacing the coating solution in the coating solution filtration device 30 or 40 by the new coating solution increases unpreferably.

It is preferable that the expanding or reducing rate on the upstream side is 0.025 or more. More preferable is 0.1 or more, and further more preferable is 0.15 or more.

It is preferable that the expanding or reducing rate on the downstream side is 0.1 or more. More preferable is 0.15 or more.

If the expanding or reducing rate is less than 0.025 on the upstream side and less than 0.1 on the downstream side, the coating solution is less likely to flow uniformly in the passages. The effect of this passage form in decreasing the retention of the coating solution can be confirmed if the flow is visualized.

The coating solution filtration device 40 shown in FIG. 5 is the same as the coating solution filtration device 30 shown in FIG. 4, except that the passages in the upstream housing 46 and the downstream housing 47 are not conical, but have a conical face and a radius face in combination. Like the coating solution filtration device 30, the coating solution filtration device 50 is also substantially free from the portions where the flow of the coating solution does not occur at all, and so the retention of the coating solution does not substantially occur.

In this specification of the invention, being smooth means being substantially free from a dead space. The dead space in this case refers to a portion in a housing where a gas or coating solution is likely to be retained.

As a particular example, in a section of the device shown in FIGS. 4 or 5 (the section obtained by cutting the device along a plane parallel to the upstream-downstream direction), it refers to a form constructed by two wall faces on both sides of one angle (including a curve having a radius of 3 mm or less). Even in the case where there is any dead space, if the angle formed between two wall faces measured in the inside of a housing is 150 to 180° (preferably 170 to 180°) or if the length of the shorter one of the two wall faces on both sides of an angle is 1 $\mu$m or less (preferably 0.1 $\mu$m or less), then it can be said that there is substantially no dead space.

In the coating solution filtration device used in the invention, it is preferable that at least either the upstream passage or the downstream passage has a smoothly expanding form or a smoothly reducing form as described above. Of course, it is preferable that both the upstream and downstream passages have a smoothly expanding or reducing form respectively as described above. However, even if either passage has such a form, it is effective. In this case, considering that objects generated due to retention can be removed by filtration, it is preferable that the downstream passage only has a smoothly reducing form rather than that the upstream passage only has a smoothly expanding form.

The form of the filter medium 24 (FIG. 1), 31 (FIG. 4) or 41 (FIG. 5) in the coating solution filtration device used in the invention is not especially limited, and can be polygonal, ellipsoidal or of any other curved form, etc. However, in view of uniform filtration in the entire surface of the filter medium 24, 31 or 41, a circular form is preferable.

Furthermore, for example, if the coating solution filtration device is the coating solution filtration device 30, it is preferable that the rate of hole area of the downstream screen 34 installed adjacently to the downstream side of the disc-shaped filter medium 31 of the coating filtration device 30 is 60% or more. More preferable is 85% or more.

If the rate of hole area is 60% or more, the contact area for supporting the pressurized filter medium 31 becomes required minimum. So, the retention of the coating solution on the contact face between the filter medium 31 and the downstream screen 34 can be prevented from occurring. If the rate of hole area is less than 60%, the coating solution is likely to be retained on the contact face. To keep the rate of hole area larger to keep the contact area smaller, it is preferable to use a screen like the downstream screen 34 (FIG. 9) in which through portions 34a surrounded by 1 mm or less wide threads 34b are formed.

It is preferable that the upstream screen 33 and the downstream screen 34 are made of stainless steel in view of rigidity and rust prevention. However, in the case where a highly rigid filter medium such as a sintered metal filter medium is used as the filter medium 31, it is not necessary to use the downstream screen 34.

The coating solution filtration device such as the coating solution filtration device 30 used in the invention allows easy air venting and can prevent the infiltration of air from outside, compared with the conventional coating solution filtration device 50, because of the following constitution.

In the coating solution filtration device 30, since the annular seal 32 for substantially precluding the formation of the dead space is arranged around the filter medium 31, the dead space B (FIG. 7) where air remains, of the conventional coating solution filtration device 50 does not exist and it can be perfectly prevented that the air in the dead space B infiltrates into the filter medium 31.

In the case where a sintered metal filter medium is used as the filter medium 31, the circumferential edge of the filter medium 31 can be pressed to eliminate the gap, instead of using the annular seal 32 for substantially precluding the formation of the dead space.

In this case, the annular seal for substantially precluding the formation of the dead space refers to an annular seal for precluding the formation of any gap since the annular seal 32 is kept in close contact with the other members it contacts (housings, screens and filter medium).

For this purpose, the annular seal 32 must have a form adapted to the space form into which it is fitted and have moderate resiliency. Especially it is important that the annular seal 32 has the resiliency in the diameter direction to absorb the error in the size of the filter medium 31. In the diameter direction, it is preferable that the inner face of the annular seal 32 recedes by 2 to 5 mm on the outer circumference side from the inner faces of the annular packings 35. If the difference is less than the lower limit of the range, it may happen that some of the fluid is coming from the upstream side flows without passing the filter medium 31, and if the difference is more than the upper limit of the range, air may remain in the circumferential portion of the annular seal 32.

In the coating solution filtration device 30, since the passage 39a of the downstream housing 37 is formed to smoothly reduce upward from the filter medium 31 toward the outlet 39, the air passing the filter medium 31 gathers at the outlet 39 due to its buoyancy and can be easily discharged outside the coating solution filtration device 30.

In the above constitution, air is easily discharged, and no air comes in from outside. So, it does not substantially happen that air remains in the coating solution filtration device. As a result, the discharge responsiveness at the beginning and end of coating when the pressure variation is large becomes good since it is not disturbed by the remaining air, and coated substrates having uniform film thickness and high grade film surface can be produced.

Furthermore, for efficient discharge of air, the inventors newly find that a method of installing a pressure gauge and a valve (not illustrated) in this order downstream of the coating solution filtration device 23 (FIG. 1), feeding the coating solution with the valve closed to raise the internal pressure of the coating solution filtration device 23, and suddenly opening the valve when the pressure detected by the pressure gauge reaches a set value is very effective for discharging the air remaining inside the coating solution filtration device 23.

The above constitution is described below particularly in reference to FIG. 1. A pressure gauge and a valve are installed in this order between the coating solution filtration device 23 and the die 17, and the coating solution is fed with the valve closed as described above. When the pressure detected by the pressure gauge reaches a specified value, the valve is suddenly opened, to discharge the air remaining inside the coating solution filtration device 23 at a time together with the coating solution. In this case, it is preferable that the valve is opened automatically with its action interlocked with the pressure gauge, but the valve can also be manually opened while the operator watches the pressure gauge. In the case of automatic operation, the air discharge action can be easily carried out plural times while the predetermined quantity supply pump 14 discharges once.

In this case, if the time taken after once carrying out the air discharge action till closing the valve again in preparation for the next air discharge action while the predetermined quantity supply pump 14 discharges the coating solution is kept as short as possible, the air discharge action can be carried out many times while the pump discharges the coating solution once, and the air venting work time can be shortened. To inhibit the generation of objects due to the abnormal retention of the coating solution downstream of the coating solution filtration device 23, it is preferable to remove the pressure gauge and the valve installed between the coating solution filtration device 23 and the die 17 after completion of air venting.

It is desirable that the annular seal 32 for substantially precluding the formation of dead space is rectangular in cross sectional form in view of the adhesion to the housing 36, and it is preferable that the material of the annular seal 32 is red silicone or fluorine resin respectively excellent in chemicals resistance and unlikely to be swollen.

Filter media preferably used as the filter medium 31 include woven fabrics and non-woven fabrics composed of polypropylene, polyethylene, ethylene tetrafluoride and glass fibers, porous ceramics and sintered metals, but any other material can also be used if it has satisfactory filtration performance. The most preferable filter medium is a filter made of a sintered stainless steel as described before.

A particular case of applying the invention for coating blank substrates with pigment-dispersed color pastes for color filter use is described below.

As the colorants, organic pigments or inorganic pigments can be used. In view of chromaticity, heat resistance, chemicals resistance and light resistance, it is desirable to use organic pigments. Furthermore, various additives such as an ultraviolet light absorber, dispersing agent and leveling agent can also be added. Especially to improve the dispersion stability of the pigments and to lower the yield value, it is desirable to add a dispersion stabilizer.

As the light-screening agent in the black paste, for example, carbon black, metal oxide powder of titanium oxide, titanium oxide nitride or iron tetroxide, metal sulfide powder, metal powder or a mixture of red, blue and green pigments can be used. Among them, carbon black is especially preferable since it has excellent light screening capability. Since carbon black having a grain size excellent in dispersibility has a brownish tone, it is preferable to mix a pigment of a color complementing that of carbon black, for making the carbon black achromatic.

For the black paste for color filter use used in a liquid crystal device driven in an electric field parallel to the substrate, it is preferable to use titanium oxide nitride for enhancing the volume resistivity of the black matrix. The black paste can also contain various additives such as an ultraviolet light absorber, dispersing agent and leveling agent as in the case of color pastes. Especially to improve the dispersion stability of the light-screening agent and to lower the yield value, it is desirable to add a dispersion stabilizer.

The matrix resin used for a paste is not especially limited, and for example, a photosensitive or non-photosensitive material such as an epoxy resin, acrylic resin, urethane resin, polyester resin, polyimide resin, polyolefin resin or gelatin can be preferably used. It is preferable to disperse or dissolve a colorant or light-screening agent into any of these resins for coloring.

Types of photosensitive resins include photo-decomposable resins, photo-crosslinkable resins and photo-polymerizable resins. Especially a photosensitive composition containing a monomer, oligomer or polymer having ethylenic unsaturated bonds and an initiator capable of generating radicals with ultraviolet light, or a photosensitive polyamic acid composition can be suitably used.

As the non-photosensitive resin, a resin that can be developed by any of said various polymers can be preferably used, and a resin having heat resistance that can withstand the heat applied in the transparent electroconductive film formation process and in the liquid crystal device production process is preferable. Furthermore, a resin having resistance to the organic solvent used in the liquid crystal display device production process is preferable. So, a polyimide resin or acrylic resin can be especially preferably used.

In the case where the matrix resin is a polyimide resin, solvents that can be suitably used include amide-based polar solvents such as N-methyl-2-pyrrolidone (hereinafter called NMP), N,N-dimethylacetamide and N,N-dimethylformamide, and lactone-based polar solvents such as γ-butyrolactone (hereinafter called γBL).

The polyimide resin is not especially limited, but usually a resin obtained by imidating a polyimide precursor (n=1 or 2) having the structural unit represented by the following general formula (III) as a main component, by means of heating or any adequate catalyst can be suitably used.

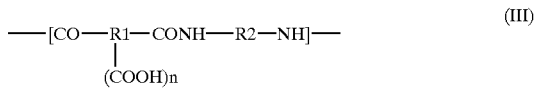

(III)

(where n=1 or 2)

Furthermore, the polyimide resin can also contain other bonds than imide bonds such as amide bonds, sulfone bonds, ether bonds and carbonyl bonds in addition to imide bonds.

In the above general formula (III), R1 denotes a trivalent or tetravalent organic group having at least two or more carbon atoms. In view of heat resistance, it is preferable that R1 denotes a trivalent or tetravalent group containing a cyclic hydrocarbon, aromatic ring or aromatic heterocycle and having 6 to 30 carbon atoms.

Examples of R1 include a phenyl group, biphenyl group, ter-phenyl group, naphthalene group, perylene group, diphenyl ether group, diphenyl sulfone group, diphenylpropane group, benzophenone group, biphenyl trifluoropropane group, cyclobutyl group and cyclopentyl group, though not limited thereto.

R2 denotes a divalent organic group having at least two or more carbon atoms. In view of heat resistance, it is preferable that R2 denotes a divalent group containing a cyclic hydrocarbon, aromatic ring or aromatic heterocycle and having 6 to 30 carbon atoms.

Examples of R2 include a phenyl group, biphenyl group, ter-phenyl group, naphthalene group, perylene group, diphenyl ether group, diphenyl sulfone group, diphenylpropane group, benzophenone group, biphenyl trifluoropropane group, diphenylmethane group and dicyclohexylmethane group, though not limited thereto.

In the polymer having the structural unit represented by said general formula (III) as the main component, R1 and R2 respectively can consist of one group selected from the above groups, but can also be a copolymer group consisting of two or more of the groups. Furthermore, to improve the adhesiveness to the substrate, it is preferable to copolymerize a diamine component such as bis(3-aminopropyl) tetramethyldisiloxane having a siloxane structure to such an extent that the heat resistance is not lowered.

Examples of the polymer containing the structural unit represented by said general formula (III) as the main component include polyimide precursors synthesized from one or more carboxylic dianhydrides selected from a group consisting of pyromellitic dianhydride, 3,3',4,4'-benzophenonetetracarboxylic dianhydride, 4,4'-oxydiphthalic dianhydride, 3,3',4,4'-biphenyltrifluoropropanetetracarboxylic dianhydride, 3,3',4,4'-biphenylsulfonetetracarboxylic dianhydride and 2,3,5-tricarboxycyclopentyl dianhydride and from one or more diamines selected from a group consisting of paraphenylenediamine, 3,3'-diaminodiphenyl ether, 4,4'-diaminodiphenyl ether, 3,4'-diaminodiphenyl ether, 3,3'-diaminodiphenylsulfone, 4,4'-diaminodiphenylsulfone, 4,4'-diaminodicyclohexylmethane, 4,4'-diaminodiphenylmethane and 4,4'-diaminobenzanilide, though not limited thereto. Any of these polyimide precursors can be synthesized by a publicly known method, i.e., by letting a tetracarboxylic dianhydride and a diamine respectively selected react with each other in a solvent.

A paste for color filter use can be produced, for example, by a method of mixing a resin and a colorant or light-screening agent in a solvent and dispersing the mixture in a dispersing machine such as a sand grinder, ball mill or sand mill.

A method for producing a color filter using pastes for color filter use is described below.

That is, said pastes for color filter use are used to produce a color filter. Particularly, a transparent substrate is coated with said pastes for color filter use, as color pastes and/or black paste, to produce a color filter.

A color filter production method is described below further in reference to examples.

In the invention, a color filter has plural color layers of three primary colors arranged on a transparent substrate. A color filter means a filter consisting of many picture elements, with the pixels formed by the respective color layers of three primary colors as one picture element.

In the case where the three colors are expressed by the additive color process, three primary colors of red (R), green (G) and blue (B) are selected, and in the case where they are expressed by the subtractive color process, three primary colors of cyan (C), magenta (M) and yellow (Y) are selected. Each element containing these three primary colors as a unit can be a picture element of color display.

The transparent substrate is not especially limited. For example, an inorganic glass such as quartz glass, borosilicate glass, aluminisilicate glass or soda-lime glass coated on the surface with silica, or an organic plastic film or sheet can be preferably used.

A color layer can be formed, for example, by coating a transparent substrate directly with a color paste or after forming a black matrix, drying and patterning.

A black paste or color paste can be applied by such a method as the spin coating, roll coating, bar coating or die coating mentioned before, though the method is not limited thereto. The die coating can be preferably used. The transparent substrate coated with a paste to form a wet film is heated and dried (semi-cured) using an oven or hot plate. The semi-curing conditions depend on the resin and solvent used and the amount of the paste applied, but it is preferable to heat at 60 to 200° C. for 1 to 60 minutes.

The paste coating film obtained like this is exposed and developed after forming a positive photoresist coating film on it in the case where the resin is a non-photosensitive resin, or immediately or after forming an oxygen-screening film in the case where the resin is a photosensitive resin, to form a resin black matrix or color layer. As required, the positive photoresist film or the oxygen-screening film is removed, and the remaining laminate is heated and dried (cured) again. The curing conditions depend on the resin used, but in the case of obtaining a polyimide resin from a polyimide precursor, heating usually at 200 to 300° C. for 1 to 60 minutes is carried out.

The thickness of a cured color layer is decided based on the required color property and the colorant/matrix resin ratio of the color paste. It is preferable that the colorant/matrix resin ratio by weight is in a range from 5/95 to 70/30. A more preferable range is 10/90 to 60/40. If this ratio is less than 5, the thickness of the coating film required to obtain sufficient color purity becomes large, to make the level difference between pixels large, and such a problem as poor liquid crystal orientation may occur. If the ratio is more than 70, the adhesiveness of the pixels tends to be poor since the matrix resin becomes insufficient. In the case where the colorant/matrix resin ratio is in the above preferable ratio range, it is preferable that the thickness of the coated and cured film is 0.2 to 4.0 μm, to obtain desirable color property. A thickness of 0.2 μm or more is preferable in view of color purity, and a thickness of 4.0 μm or less is preferable in view of light transmittance.

In the black matrix, usually openings of 20 to 200 μm×20 to 300 μm are formed, and plural color layers of three primary colors are arranged to at least cover the openings. The pattern of arranged three primary colors can be mosaic type, triangle type, stripe type, or four pixel arrangement type and the like, and any of the types can be used suitably for each purpose.

In the above production method, at least either of a color paste or black paste can be used. In the case where a color paste is used, the black matrix can also be an inorganic material, for example, a thin metal film of Cr, Al or Ni (about 0.1 to 0.2 μm thick) or a multi-layer chromium film with a chromium oxide or chromium oxide nitride formed between chromium and the transparent substrate.

The light-screening capability of the black matrix is expressed by the OD value (common logarithm of inverse number of transmittance). To improve the display grade of the liquid crystal display device, it is preferable that the OD value is 2.5 or more. More preferable is 3.0 or more. The film thickness of the black matrix decides the upper limit of the OD value.

In the case of a resin black matrix using a black paste, it is preferable that the film thickness is 0.5 to 1.5 μm. A more preferable range is 0.8 to 1.2 μm. A film thickness of less than 0.5 μm is unpreferable in view of light-screening capability. In the case where the film thickness is more than 1.5 μm, the flatness of the color filter is likely to be sacrificed and a level difference is likely to be caused, though the light-screening capability can be ensured. If a surface level difference is caused, the level difference can be little decreased even if a transparent electroconductive film or liquid crystal orienting film is formed on the color filter, and the orientation treatment of the liquid crystal orienting film by rubbing becomes uneven, to lower the display grade of the liquid crystal display device. To lessen the surface level difference, it is effective to form a transparent protective film on a color layer.

As for the reflectance of the black matrix, to decrease the influence of the light reflected at the interface between the pixels and the light screening region for enhancing the display grade of the liquid crystal display device, it is preferable that the reflectance corrected in terms of luminosity factor in a visible region of 400 to 700 nm (Y value) is 2% or less. More preferable is 1% or less. If the reflectance is more than 2%, the surface reflection light lowers the display contrast.

A color liquid crystal display device using pastes for color filter use is described below. A color liquid crystal display device has a liquid crystal layer held between a transparent electrode substrate and a color filter having transparent electrodes, and can be any color liquid crystal display device having the color filter produced using said pastes for color filter use. The color filter can have a transparent protective layer on the color layers as required, and, for example, an ITO film is formed as transparent electrodes on the color filter, to oppose the transparent electrode substrate.

The transparent electrode substrate positioned to oppose the color filter has, for example, patterned transparent electrodes formed as an ITO film on the transparent substrate, and furthermore, for example, thin film transistor (TFT) elements, thin film diode (TFD) elements, scanning lines and signal lines can be provided to suit each purpose in addition to the transparent electrodes on the transparent electrode substrate, to prepare a TFR liquid crystal display device or TFD liquid crystal display device.

A color liquid crystal display device can be produced by forming the color filter having transparent electrodes and a liquid crystal orienting film on the transparent electrode substrate, carrying out orientation treatment for example by rubbing, scattering spacers such as plastic beads, bonding the color filter and the transparent electrode substrate to each other using a sealant, injecting a liquid crystal from an inlet formed in the sealed portion, and sealing the inlet. Furthermore, a polarizing plate is bonded to the outside of the substrate and, for example, IC drivers are mounted to complete a module.

The above-mentioned color liquid crystal display device can be used as a display screen of an apparatus such as a personal computer, word processor, engineering workstation, navigation station, liquid crystal television or video, and can also be suitably used for liquid crystal projection.

EXAMPLES

The invention is described below in more detail in reference to examples, but is not limited thereto or thereby.

Examples 1–6 and Comparative Examples 1–3

The polyimide precursor A-1, oligoamic acid dispersing agent A-2 and pigment-dispersed red paste for color filter use respectively used in the examples were produced according to the following methods.

A: Method for Producing Polyimide Precursor A-1

3,3',4,4'-biphenyltetracarboxylic dianhydride, 4,4'-diaminodiphenyl ether and bis(3-aminopropyl) tetramethyldisiloxane were caused in react with each other in a mixed solvent consisting of γBL and NMP, to obtain a solution of polyimide precursor A-1.

B: Method for Producing Oligoamic Acid Dispersing Agent A-2

3,3',4,4'-diphenylsulfonetetracarboxylic dianhydride, anhydrous pyromellitic dianhydride, 3,3'-diaminodiphenylsulfone and bis(3-aminopropyl) tetramethyldisiloxane were caused to react with each other in γBL solvent, and the ends were sealed with 2-aminoanthraquinone, to obtain a solution of oligoamic acid dispersing agent A-2.

C: Method for Producing Pigment-Dispersed R Paste for Color Filter Use

Ingredients were stirred at 7000 rpm for 30 minutes using a homogenizer (produced by Nippon Seiki Seisakusho) and using glass beads (GB737 produced by Toshiba Barodieni) to obtain a pigment dispersion, and it was diluted to obtain a color paste of the following composition (solid content 5.1 wt %). The viscosity of this red paste was 23 mPa·s.

| | | |
|---|---|---|
| Red pigment 1: | Pigment Red 254 | 0.8 wt % |
| Red pigment 2: | Pigment Red 177 | 0.3 wt % |
| Yellow pigment: | Pigment Yellow 138 | 0.3 wt % |
| Dispersing agent: | Oligoamic acid A-2 | 0.1 wt % |
| Resin: | Polyimdide precursor A-1 | 3.6 wt % |
| Solvent: NMP, γBL | | 94.9 wt % |

The leaf coater (die coater) shown in FIG. 1 using the die coating method was used to coat 100 clean glass substrates (0.62 m×0.75 m), and the change in the number of polymer gel particles and cohering pigment particles was examined. The result is shown in Table 1.

TABLE 1

| | Material of filter medium (Note 1) | Young's modulus (MPa) (Note 2) | Pore size (μm) | Filtration rate (g/s · m$^2$) | Cohering particles (number/ substrate) (Note 3) | Coating stability (Note 4) |
|---|---|---|---|---|---|---|
| Example 1 | GF | 7,000 | 5 | 500 | 3 | Good |
| Example 2 | GF | 7,000 | 10 | 500 | 7 | Good |
| Example 3 | SUS | 200,000 | 3 | 500 | 0 | Good |
| Example 4 | SUS | 200,000 | 3 | 300 | 2 | Good |
| Example 5 | SUS | 200,000 | 5 | 500 | 2 | Good |

TABLE 1-continued

|  | Material of filter medium (Note 1) | Young's modulus (MPa) (Note 2) | Pore size (μm) | Filtration rate (g/s · m²) | Cohering particles (number/ substrate) (Note 3) | Coating stability (Note 4) |
|---|---|---|---|---|---|---|
| Example 6 | SUS | 200,000 | 10 | 500 | 5 | Good |
| Comparative Example 1 | PTFE | 25 | 4 | 500 | 50 | Poor |
| Comparative Example 2 | PTFE | 25 | 4 | 300 | 89 | Poor |
| Comparative Example 3 | PP | 30 | 5 | 500 | 30 | Poor |

(Note 1) GF: Glass fibers SUS: SUS316 PTFE: Ethylene tetrachloride
(Note 2) The value of a resin was measured according to JIS K 6911, and the value of GF or SUS was measured using a tensile testing machine.
(Note 3) The total number of polymer gel particles and cohering pigment particles of 10 μm or more in projection height on the first substrate after start of coating was counted.
(Note 4) The increase of the particles stated in Note 3 was examined after continuously coating 100 substrates. (Good: The number little increased. Poor: An apparent tendency of increase was observed.)

In Comparative Examples 1 to 3 where filter media having a Young's modulus of less than 200 MPa were used, the total number of polymer gel particles and cohering pigment particles (expressed simply as "cohering particles" in the table) of 10 μm or more in projection height was very large. So, if the individual particles are removed using any publicly known projection removing technique such as a polishing tape, it takes a long time for removing the projections, to substantially lower the production yield of color filters.

If such a substrate is used for a color filter without removing the projections, the cohering particles contact the opposite transparent electrode substrate, to make pixel defects in the liquid crystal display element.

Since the number of cohering particles in the continuous coating of 100 substrates apparently tended to increase, it was necessary to exchange the filter more frequently.

On the other hand, in Examples 1 to 6 where filter media having a Young's modulus of 200 MPa or more were used, the number of cohering particles was small, and the individual particles can be removed using a publicly known projection removing technique such as a polishing tape.

Especially in Example 3 where a filter medium made of sintered stainless steel and having the smallest pore size was used, the generation of cohering particles did not occur at all.

Examples 1 to 6 did not show a tendency of increase in the number of cohering particles in the continuous coating of 100 substrates, and the frequency of exchanging the filter can be low.

Example 7

On a 0.7 mm thick no-alkali glass substrate of 360×465 mm, formed was a 1 μm thick black matrix film having a lattice having a pitch of 456 μm in the lateral direction of the substrate and a pitch of 152 μm in the longitudinal direction of the substrate, a line width of 30 μm, 1920 RGB pixels in the longitudinal direction of the substrate and 480 RGB pixels in the lateral direction of the substrate, and an overall diagonal length of 14.4 inches (219 mm in the lateral direction of the substrate and 292 mm in the longitudinal direction of the substrate). The black matrix film used titanium oxide nitride as the light-screening agent and polyamic acid as the binder.

The coating solution filtration device 30 had a screen as shown in FIG. 8 having numerous holes 33a having a diameter of 0.5 mm to have a rate of hole area of 60%, as the upstream screen 33, a screen as shown in FIG. 9 having scope-shaped through portions 34a demarcated by 0.8 mm thick threads 34b to have a rate of hole area of 90%, as the downstream screen 34, and a sintered stainless steel filter medium having a pore size of 4 μm and a diameter of 90 mm as the filter medium 31.

The coating solution filtration device 30 was a coating solution filtration device as shown in FIG. 4, in which the internal passage 38a expanded conically at a rate of 0.07 from the inlet 38 toward the filter medium 31 while the internal passage 39a reduced conically at a rate of 0.22 from the filter medium 31 toward the outlet 39.

In the leaf coater (die coater) shown in FIG. 1 having the above coating solution filtration device 30, the buffer tank 25 was filled with an R paste prepared using polyamic acid as the binder, a mixture consisting of γ-butyrolactone, N-methyl-2-pyrrolidone and 3-methyl-3-methoxybutanol as the solvent, and further 10%, as solid content, of Pigment Red 177 as the pigment and having a viscosity of 50 mPa·s, and the coating solution was fed by the predetermined quantity supply pump 14 at a discharge rate of 8,000 μl/s for a discharge time of 3 seconds and at a suction rate of 3,000 μl/s for a suction time of 8 seconds from the buffertank 25 to the die, while discharging air. Under these conditions, it took 10 minutes to perfectly discharge air.

The die 17 used had a slip 17a having a gap of 100 μm and a width of 220 m, and the blank substrate 18, from which particles were removed by wet washing, was coated uniformly on the entire surface with the coating solution at a coating rate of 3 m/min to have a coating thickness of 20 μm, with the gap between the substrate 18 and the die 17 set at 100 μm.

The coated substrate was dried at 100° C. for 20 minutes using a hot plate as a dryer.

In succession, it was coated with a resist solution having a solid content of 10% and a viscosity of 8%, to have a thickness of 10 μm, dried at 90° C. for 10 minutes using a hot plate, was exposed and developed using a photo mask, had the coating film removed to leave the R pixel portions only, and was heated and cured at 260° C. for 30 minutes using a hot plate.

Similarly, coating films of G and B colors were also formed uniformly on the entire surface using the die coater, and patterned in a predetermined lattice.

In this case, as the G color solution, used was a solution prepared using Pigment Green 36 to have a solid content of 10% and a viscosity of 40 mPa·s, and as the R color solution, used was a solution prepared using Pigment Blue 15:6 to have a solid content of 10% and a viscosity of 50 mPa·s.

Finally, ITO was sputtered for vapor deposition, to produce a color filter.

The film thicknesses of the produced color filters and the numbers of formed particles were measured. In the irregular thickness regions formed at the beginning and end of coating, the average thickness was 9.5 mm, and the average number of particles of 4 μm or more was 3/substrate.

Comparative Example 4

Color filters were produced as described for Example 7, except that the conventional filtration device 50 was used as the filtration device. The film thicknesses of the produced color filters and the numbers of formed particles were measured similarly. In the irregular thickness regions formed at the beginning and end of coating, the average thickness was 18 mm, and the average number of particles of 4 μm or more was 7/substrate.

What is claimed is:

1. A leaf coater comprising the combination of a coating solution supply source, a coating solution quantity intermittent supply means, a coating solution applying means for applying coating solution to each blank substrate, a first coating solution flow pipeline connecting the coating solution supply source with the intermittent supply means, a second coating solution flow pipeline connecting the intermittent supply means with the applying means, and a coating solution filtration means provided in either the first or second coating solution flow pipeline, which comprises a housing having an inlet and an outlet of the coating solution and a coating solution filtration means composed of a filter medium provided in the passage of the coating solution in the housing, wherein the Young's modulus of the filter medium in the filtration means is not less than 200 MPa and the pore size of the filter medium is in the range of 0.05 to 100 μm.

2. A leaf coater according to claim 1, wherein said filter medium in said coating solution filtration means comprises a sintered metal.

3. A leaf coater according to claim 1, wherein said passage of the coating solution in said coating solution filtration means has a shape of smoothly expanding from said inlet toward said filter medium and/or smoothing reducing from said filter medium toward said outlet, and the expanding and/or reducing rate conforms to the relation of the following formula (I) and/or (II):

$$0.025 \leq h_{IN}/(d_{FLT}-d_{IN}) \leq 1.0 \quad \text{(I)}$$

$$0.1 \leq h_{OUT}/(d_{FLT}-d_{OUT}) \leq 1.0 \quad \text{(II)}$$

where $d_{IN}$: Bore of the inlet [mm]

$d_{OUT}$: Bore of the outlet [mm]

$d_{FLT}$: Diameter actually used for filtration in the filter medium [mm]

$h_{IN}$: Distance from the inlet to the filter medium [mm]

$h_{OUT}$: Distance from the outlet to the filter medium [mm].

4. A leaf coater according to claim 3, wherein a screen is provided adjacently to said filter medium in said coating solution filtration means downstream of said filter medium, and the rate of hole area of said screen is not less than 60%.

5. A leaf coater according to claim 3, wherein a screen is provided adjacently to said filter medium in said coating solution filtration means upstream of said filter medium, and the rate of hole area of said screen is not less than 60%.

6. A leaf coater according to claim 3, wherein an annular seal is provided around the lateral circumferential face of said filter medium in said coating solution filtration means, to prevent the formation of any dead space.

* * * * *